(12) United States Patent
Nitta

(10) Patent No.: US 7,530,293 B2
(45) Date of Patent: *May 12, 2009

(54) INDEX TABLE ASSEMBLY

(75) Inventor: Tetsuya Nitta, Kanazawa (JP)

(73) Assignee: Tsudakoma Kogyo Kabushiki Kaisha, Kanazawa-Shi (JP)

( * ) Notice: Subject to any disclaimer, the term of this patent is extended or adjusted under 35 U.S.C. 154(b) by 820 days.

This patent is subject to a terminal disclaimer.

(21) Appl. No.: 10/889,097

(22) Filed: Jul. 13, 2004

(65) Prior Publication Data
US 2005/0097976 A1      May 12, 2005

(30) Foreign Application Priority Data
Nov. 7, 2003   (JP) .............................. 2003-378894

(51) Int. Cl.
*B23Q 16/00*    (2006.01)
(52) U.S. Cl. .................................... 74/813 R
(58) Field of Classification Search ............... 74/425, 74/490.09, 490.07, 813 R, 813 L, 816
See application file for complete search history.

(56) References Cited

U.S. PATENT DOCUMENTS

| | | | | |
|---|---|---|---|---|
| 4,380,939 A | * | 4/1983 | Gardner | 74/813 L |
| 5,201,249 A | * | 4/1993 | Sterenberg | 74/825 |
| 6,698,306 B2 | * | 3/2004 | Tatsuda | 74/427 |
| 7,418,889 B2 | * | 9/2008 | Nitta | 74/813 L |
| 2005/0151048 A1 | * | 7/2005 | Nitta | 248/636 |

FOREIGN PATENT DOCUMENTS

JP      2930889      11/1996

* cited by examiner

*Primary Examiner*—Vicky A Johnson
(74) *Attorney, Agent, or Firm*—Edwards Angell Palmer & Dodge LLP

(57) ABSTRACT

An index table assembly includes a rotary table having a workpiece-receiving surface on one side and a through hole at a rotational center of the rotary table, the through hole having a step portion extending toward the rotational center in the middle of the through hole, a frame separated from the rotary table in the direction of a rotational axis of the rotary table and including a shaft portion extending through the step portion and a bearing support detachably attached to the shaft portion, the bearing support facing a surface of the step portion on the same side as the workpiece-receiving surface, a first bearing positioned between a surface of the rotary table on the side opposite to the workpiece-receiving surface and the frame, and a second bearing positioned between the surface of the step portion on the same side as the workpiece-receiving surface and the bearing support.

10 Claims, 5 Drawing Sheets

INDEX TABLE ASSEMBLY

BACKGROUND OF THE INVENTION

1. Field of the Invention

The present invention relates to index table assemblies.

2. Description of the Related Art

Index table assemblies including a rotary table, a frame separated from the rotary table in the direction of a rotational axis of the rotary table, and two bearings disposed between the rotary table and the frame, the bearings receiving forces in opposite directions along the rotational axis, are known in the art (refer to, for example, Japanese Patent No. 2930889, FIG. 1 on page 4). In such an index table assembly, the frame supports the rotary table against an external force applied to a workpiece-receiving surface of the rotary table and the weight of the rotary table so as to maintain the workpiece-processing accuracy.

In an index table assembly disclosed in the above-mentioned patent, a frame has a through hole in which a cylindrical portion of the main body of a rotary table and a cylindrical portion of a bearing support extend from opposite directions. The cylindrical portions are fixed to each other with bolts to form a core of the rotary table. A first thrust bearing is positioned between a surface of the frame on the same side as a workpiece-receiving surface of the rotary table and the main body of the rotary table, and a second thrust bearing is positioned between a surface of the frame on the side opposite to the workpiece-receiving surface of the rotary table and a flange of the bearing support. The first thrust bearing receives a force applied in a direction from the workpiece-receiving surface of the rotary table toward the frame along the rotational axis, and the second thrust bearing receives a force applied in a direction opposite to the direction from the workpiece-receiving surface of the rotary table toward the frame along the rotational axis.

An assembly process in which the rotary table is attached to the frame when the index table assembly is manufactured or overhauled will be described below. Before assembly, the bearing support is detached from the rotary table. First, the first thrust bearing is installed onto the frame from the side of the workpiece-receiving surface. Then, the main body of the rotary table is installed onto the first thrust bearing from the same side such that the cylindrical portion of the main body of the rotary table is inserted into the through hole. Then, the second thrust bearing is installed onto the frame from the opposite side, that is, from the side opposite to the workpiece-receiving surface. Then, the bearing support is installed onto the second thrust bearing from the same side as the second thrust bearing such that the cylindrical portion of the bearing support is inserted into the through hole. Then, the cylindrical portion of the bearing support and the cylindrical portion of the main body of the rotary table are fixed to each other with the bolts, and the process of attaching the rotary table to the frame is completed.

In this index table assembly, the main body of the rotary table and the first thrust bearing are installed from the side of the workpiece-receiving surface and the second thrust bearing and the bearing support are installed from the side opposite to the workpiece-receiving surface. Therefore, the frame must be turned over at some point, and this must be performed carefully since there is a risk that the first thrust bearing and the main body of the rotary table, which are already installed on the frame, will be displaced due to their own weights.

In addition, in the above-described index table assembly, the cylindrical portion of the main body of the rotary table and the cylindrical portion of the bearing support are fixed to each other with a shim interposed therebetween, and a suitable preload is applied to the first and second thrust bearings by adjusting the thickness of the shim. When a suitable preload is applied to the thrust bearings, no play is provided along the rotational axis and the rotary table is prevented from being displaced along the rotational axis due to the external force, so that the workpiece-processing accuracy is maintained. In addition, the thrust bearings are prevented from being worn in a short time due to excessive preload and the rotational resistance is set low.

When the bearing support is attached to the main body of the rotary table, the preload applied to the thrust bearings is adjusted by changing the thickness of the shim while rotating the frame, which is placed on top of the rotary table at this time, and monitoring the rotational resistance of the frame. However, a load applied on the thrust bearings in the normal state in which the rotary table is on top of the frame is different from that in the state in which the heavy frame is on top of the rotary table, and therefore the rotational resistance of the thrust bearings is also different between the two states. Accordingly, the rotational resistance of the rotary table generated when the rotary table is rotated in the normal state must be calculated while rotating the frame, and it is difficult to apply a suitable preload to the thrust bearings.

In order to eliminate the step of turning over the frame, the rotary table may be attached while the frame is placed such that the rotational axis of the rotary table extends horizontally. However, in this case, the main body of the rotary table and the thrust bearings cannot be installed onto the frame using their own weights, and therefore the task of installing them is difficult. In addition, when the preload is adjusted while rotating the rotary table and monitoring the rotational resistance of the rotary table, the load of the rotary table is not applied to the thrust bearings. Therefore, similar to the above-described case, the rotational resistance of the rotary table in the normal state must be calculated, and it is difficult to apply a suitable preload to the thrust bearings.

SUMMARY OF THE INVENTION

In order to solve the above-described problems, an object of the present invention is to provide a high-precision index table assembly in which a rotary table is easily attached to a frame and a suitable preload is applied to bearings.

In order to attain the above-described object, an index table assembly according to the present invention includes a rotary table having a workpiece-receiving surface on one side and a through hole at a rotational center of the rotary table, the through hole having a step portion extending toward the rotational center in the middle of the through hole; a frame separated from the rotary table in the direction of a rotational axis of the rotary table and including a shaft portion extending through the step portion and a bearing support detachably attached to the shaft portion, the bearing support facing a surface of the step portion on the same side as the workpiece-receiving surface of the rotary table; and first and second bearings disposed between the rotary table and the frame, the first bearing being positioned between a surface of the rotary table on the side opposite to the workpiece-receiving surface and the frame and the second bearing being positioned between the surface of the step portion on the same side as the workpiece-receiving surface and the bearing support.

In a process of attaching the rotary table to the frame, the rotary table and the first and second bearings are installed from the same side of the frame while the bearing support is detached, and then the bearing support is installed from the same side.

More specifically, the first bearing is installed onto the frame from the side of the workpiece-receiving surface before the rotary table is installed onto the frame. Then, the rotary table is installed onto the frame from the same side with the first bearing interposed between them.

The through hole in the rotary table has the step portion extending toward the rotational center, and the second bearing is inserted into the through hole from the same side as the rotary table and installed onto the surface of the step portion on the same side as the workpiece-receiving surface.

After the second bearing is installed, the bearing support is inserted into the through hole from the same side as the rotary table and attached to the main body of the frame such that the second bearing is pressed between the bearing support and the surface of the step portion on the same side as the workpiece-receiving surface. Accordingly, the process of attaching the rotary table to the frame is completed.

As described above, the rotary table, the first and second bearings, and the bearing support are all installed onto the frame from the same side of the frame, that is, from the side of the workpiece-receiving surface.

Since the rotary table, the first and second bearings, and the bearing support are installed onto the frame from the same side in the process of attaching the rotary table to the frame, the rotary table is easily installed with high precision.

Since the first bearing is provided between the surface of the rotary table on the side opposite to the workpiece-receiving surface and the frame, the first bearing receives a force applied in the direction from the workpiece-receiving surface to the frame along the rotational axis and prevents the rotary table from being displaced. In addition, since the second bearing is provided between the surface of the step portion on the same side as the workpiece-receiving surface and the bearing support included in the frame, the second bearing receives a force applied in a direction opposite to the direction from the workpiece-receiving surface to the frame along the rotational axis and prevents the rotary table from being displaced. Accordingly, the first and second bearings prevent the displacement of the rotary table in the opposite directions along the rotational axis, and thus the rotary table is supported by the first and second bearings.

In the index table assembly according to the present invention, the first bearing may have a larger diameter than the second bearing.

When the first bearing has a larger diameter than the second bearing, the first bearing reliably receives a force applied in the direction from the workpiece-receiving surface of the rotary table to the frame along the rotational axis without being deformed due to this force. Accordingly, the first bearing reliably supports the rotary table against an external force applied during workpiece processing.

When the external force is applied in the direction from the workpiece-receiving surface to the frame in a region outside the first and second bearings in the radial direction thereof, the rotary table receives a moment about a point on the first bearing near the region where the external force is applied. Since the second bearing receives the force applied in the direction opposite to the direction from the workpiece-receiving surface to the frame along the rotational axis, the rotary table is prevented from being tilted due to the moment. More specifically, since the first bearing has a large diameter and the second bearing receives the force caused by the moment at a position distant from the center of the moment, the force applied to the second bearing is small. Therefore, even when the second bearing has a small diameter, the rotary table is reliably supported.

Since the second bearing, which receives a small force, is smaller than the first bearing, the cost of the second bearing is reduced.

In addition, in the index table assembly according to the present invention, the bearing support may be detachably attached to the shaft portion at an end of the shaft portion.

When the bearing support is detachably attached to the shaft portion extending through the step at the end thereof, the relative position between the bearing support and the shaft portion is adjusted in a region outside the step portion. Accordingly, a preload applied to the bearings is easily and accurately adjusted by adjusting the relative position between the bearing support and the shaft portion along the rotational axis.

In addition, in the index table assembly according to the present invention, a portion of the rotary table including the workpiece-receiving surface and the step portion may consist of a single material.

When the portion of the rotary table including the workpiece-receiving surface and the step portion consist of a single material, the surface of the step portion on the same side as the workpiece-receiving surface and the workpiece-receiving surface are precisely parallel to each other and are precisely perpendicular to the rotational axis. Accordingly, rotational deflection of the rotary table is prevented and a high-precision index table assembly is obtained.

In addition, in the index table assembly according to the present invention, the surfaces between which the first and second bearings are disposed may be perpendicular to the rotational axis of the rotary table.

When the surfaces between which the first and second bearings are disposed are perpendicular to the rotational axis of the rotary table, a gap between the rotary table and the frame is maintained constant even when phases of the surfaces of the rotary table and the frame which face each other vary due to the rotation of the rotary table. Therefore, the rotary table is prevented from being displaced along the rotational axis and the workpiece-processing accuracy is maintained.

In addition, in the index table assembly according to the present invention, both of the first and second bearings may be thrust bearings.

When both of the first and second bearings are thrust bearings, the force applied along the rotational axis is reliably received and the rotary table is supported with high precision.

DESCRIPTION OF THE PREFERRED EMBODIMENTS

First Embodiment

Figure 1:
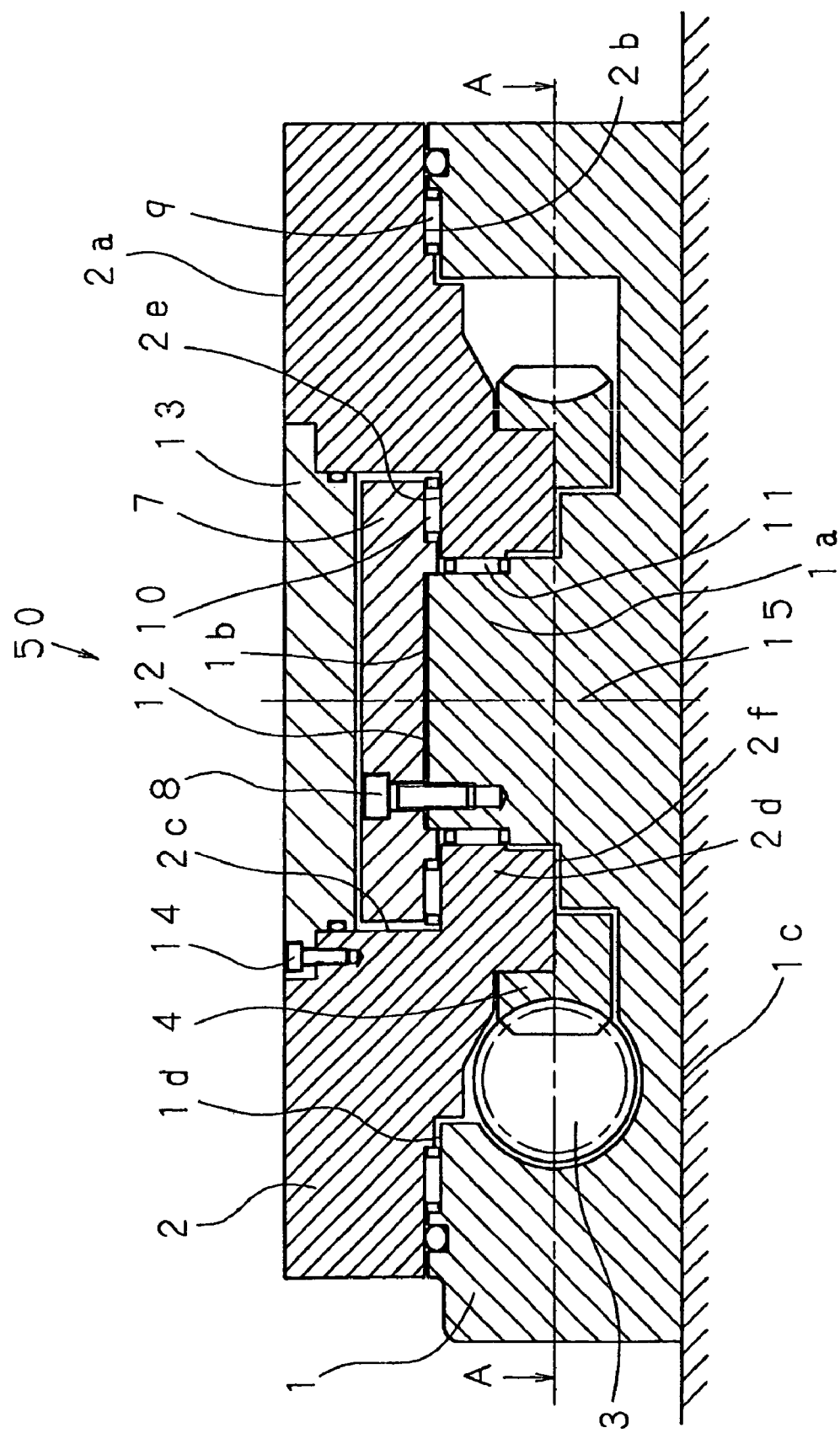
FIG. 1 is a sectional elevation view of an index table assembly according to a first embodiment of the present invention taken along line B-B in FIG. 2, which is a sectional plan view of the index table assembly.
Figure 2:
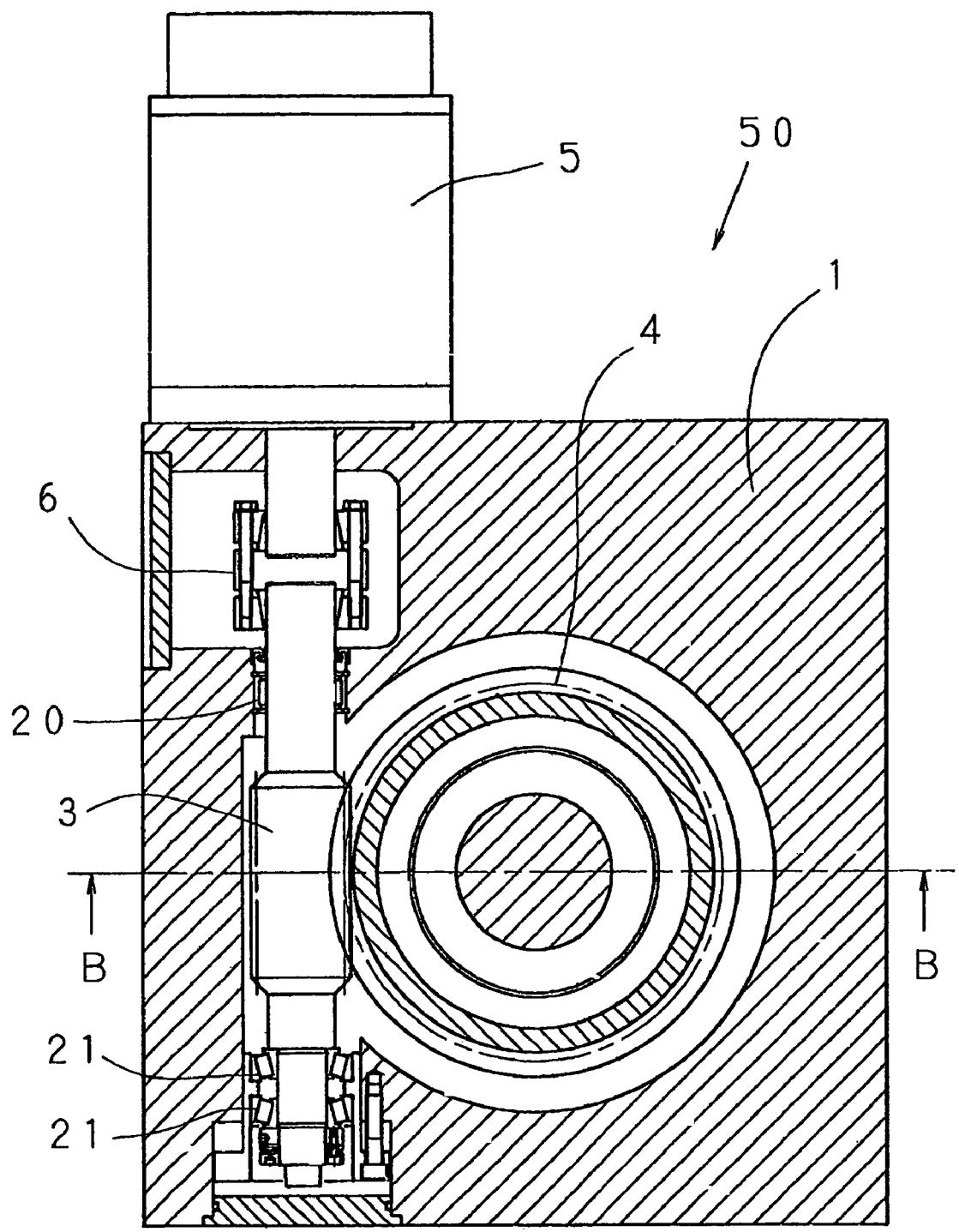
FIG. 2 is a sectional plan view of FIG. 1 taken along line A-A.

Embodiments of the present invention will be described below with reference to the accompanying drawings. FIGS. 1 and 2 are a sectional elevation view and a sectional plan view, respectively, of an index table assembly 50 according to a first embodiment of the present invention. The sectional elevation view shown in FIG. 1 is taken along line B-B in FIG. 2, and the sectional plan view shown in FIG. 2 is taken along line A-A in FIG. 1.

The index table assembly 50 includes a rotary table 2, a frame 1 which supports the rotary table 2 such that the rotary table 2 can rotate, a worm wheel 4 fixed to the rotary table 2 with bolts (not shown), a worm 3 supported in the frame 1 by two tapered roller bearings 21 and a radial bearing 20 interposed between the worm 3 and the frame 1, and a drive motor 5 connected to the worm 3 with a coupling 6.

The rotary table 2 has a workpiece-receiving surface 2a which is perpendicular to a rotational axis 15 and to which a process table, a jig, and the like (not shown) are attached, a surface 2b on the side opposite to the workpiece-receiving surface 2a, and a through hole 2c extending along the rotational axis 15. The through hole 2c is formed at a rotational center of the rotary table 2, and has a step portion 2d extending toward the rotational center, that is, toward the rotational axis 15 in the middle of the through hole 2c. The step portion 2d is formed along the entire circumference of the through hole 2c, and has a step surface 2e on the same side as the workpiece-receiving surface 2a and a step surface 2f on the side opposite to the workpiece-receiving surface 2a.

The frame 1 has a base surface 1c which is fixed to a table surface of a machine tool (not shown) and a surface 1d facing the surface 2b of the rotary table 2. In addition, the frame 1 includes a shaft portion 1a extending through the step portion 2d in the through hole 2c such that an end of the shaft portion 1a projects from the step surface 2e and a disc-shaped bearing support 7 detachably attached to the shaft portion 1a at the end of the shaft portion 1a, that is, to an end surface 1b of the shaft portion 1a with bolts 8. The bearing support 7 extends radially around the rotational axis 15 and faces the step surface 2e of the step portion 2d.

The rotary table 2 is supported on the frame 1 by two thrust bearings 9 and 10 and a radial bearing 11 interposed between the rotary table 2 and the frame 1.

More specifically, the thrust bearing 9 is placed between the surface 2b of the rotary table 2 on the side opposite to the workpiece-receiving surface 2a and the surface 1d of the frame 1 in a region near the outer periphery of the rotary table 2. The thrust bearing 10 has a smaller diameter than the thrust bearing 9 and is placed between the step surface 2e of the rotary table 2 and the bearing support 7 included in the frame 1. In addition, the radial bearing 11 is placed between the step portion 2d in the through hole 2c of the rotary table 2 and the shaft portion 1a of the frame 1.

The thrust bearing 9 is placed near the outer periphery of the rotary table 2 and has a sufficiently long load-receiving surface. Accordingly, the thrust bearing 9 reliably receives a force applied in a direction from the workpiece-receiving surface 2a of the rotary table 2 to the frame 1 along the rotational axis 15 and supports the rotary table 2 against an external force applied during workpiece processing. Thus, the rotary table 2 is prevented from being displaced and the workpiece-processing accuracy is maintained.

When the external force is applied in the direction from the workpiece-receiving surface 2a to the frame 1 in a region outside the thrust bearing 9 during workpiece processing, the rotary table 2 receives a moment about a point on the thrust bearing 9 near the region where the external force is applied. The thrust bearing 10 receives a force applied in a direction opposite to the direction from the workpiece-receiving surface 2a to the frame 1 along the rotational axis, and prevents the rotary table 2 from being tilted due to the moment. More specifically, since the thrust bearing 9 has a large diameter and the thrust bearing 10 receives the force caused by the moment at a position distant from the center of the moment, the force applied to the thrust bearing 10 is small. Therefore, although the thrust bearing 10 has a small diameter, it reliably supports the rotary table 2 without being deformed and prevents the rotary table 2 from being displaced. Accordingly, the workpiece-processing accuracy is maintained.

A preload is applied to the thrust bearings 9 and 10. Accordingly, the thrust bearing 9 is in contact with the surface 2b of the rotary table 2 on the side opposite to the workpiece-receiving surface 2a and the thrust bearing 10 is in contact with the step surface 2e on the same side as the workpiece-receiving surface 2a. More specifically, a surface of the rotary table 2 on the side opposite to the workpiece-receiving surface 2a and a surface of the rotary table 2 on the same side as the workpiece-receiving surface 2a are in contact with the thrust bearings 9 and 10, respectively, and are pressed against the frame 1 by the thrust bearings 9 and 10, respectively. The pressing force, that is, the preload applied to the thrust bearings 9 and 10 is adjusted by changing the pressing force applied to the thrust bearing 10 by the bearing support 7.

The thrust bearing 10 is placed between the step surface 2e of the rotary table 2 and the bearing support 7 included in the frame 1, and the preload is adjusted by changing the thickness of a shim 12 placed between the bearing support 7 and the end surface 1b of the shaft portion 1a. The bearing support 7 is tightened against the end surface 1b, that is, the bearing support 7 is pressed against the end surface 1b by the bolts 8 with the shim 12 interposed therebetween. In addition, the bearing support 7 is pressed against the thrust bearing 10, that is, the preload is applied to the thrust bearing 10 by a pressing force within the range of the pressing force between the bearing support 7 and the end surface 1b. When the thickness of the shim 12 is increased, the bearing support 7 moves away from the end surface 1b and the pressing force at which the bearing support 7 is pressed against the thrust bearing 10 decreases. In addition, the pressing force applied to the thrust bearing 9 via the thrust bearing 10 and the rotary table 2 also decreases. Accordingly, the preload applied to the thrust bearings 9 and 10 decreases. In contrast, when the thickness of the shim 12 is reduced or the shim 12 is removed, the bearing support 7 approaches the end surface 1b or comes into contact with the end surface 1b, and the pressing force at which the bearing support 7 is pressed against the thrust bearing 10 increases. In addition, the pressing force applied to the thrust bearing 9 via the thrust bearing 10 and the rotary table 2 also increases. Accordingly, the preload applied to the thrust bearings 9 and 10 increases.

When a suitable preload is applied to the thrust bearings 9 and 10, no play is provided along the rotational axis 15 and the rotary table 2 is prevented from being displaced along the rotational axis 15 due to the external force, so that the workpiece-processing accuracy is maintained. In addition, the thrust bearings 9 and 10 are prevented from being worn out in a short time due to excessive preload, and degradation in the rotational performance is prevented. Accordingly, the rotary table 2 is reliably rotated.

A process of attaching the rotary table 2 to the frame 1 when the index table assembly 50 is assembled will be described below.

The frame 1 is placed such that the bearing support 7 is detached and the base surface 1c faces downward. First, the thrust bearing 9 and the radial bearing 11 are installed onto the frame 1. At this time, a lower race of the thrust bearing 9 is fitted in a fitting hole formed in the frame 1 such that the thrust bearing 9 is centered on the rotational axis 15. Next, the rotary table 2 to which the worm wheel 4 is attached is installed. Accordingly, the shaft portion 1a extends through the step portion 2d in the through hole 2c such that the shaft portion 1a projects from the step surface 2e of the step portion 2d at the end thereof. At this time, the step portion 2d in the through hole 2c is fitted around an outer race of the radial bearing 11 such that the rotary table 2 is centered on the rotational axis 15. Then, the thrust bearing 10 is installed onto the step surface 2e, and the shim 12 with a suitable thickness is placed on the end surface 1b. Then, the bearing support 7 is installed. The bearing support 7 has a fitting shaft to which the thrust bearing 10 is fitted, and a fitting hole for receiving the shaft portion 1a is formed in the fitting shaft. The shaft portion 1a and an upper race of the thrust bearing 10 are respectively fitted to the fitting hole and the fitting shaft of the bearing support 7 such that the thrust bearing 10 is centered on the rotational axis 15. Then, the bearing support 7 is attached to the end surface 1b of the shaft portion 1a with the bolts 8. In this state, the thrust bearing 10 receives the preload and the thrust bearing 9 receives the sum of the preload and the load of the rotary table 2.

A force required for causing the rotary table 2 to start rotating is measured by pulling a spring scale attached to the rotary table 2 at a predetermined position in a tangential direction. When the force required for causing the rotary table 2 to start rotating is greater than a predetermined force, that is, when the required rotational torque is greater than a predetermined value and the preload applied to the thrust bearings 9 and 10 is greater than a desired preload, the thickness of the shim 12 is increased and the bearing support 7 is moved away from the end surface 1b so as to reduce the preload. In contrast, when the required rotational torque is smaller than the predetermined value, that is, when the preload applied to the thrust bearings 9 and 10 is small, the thickness of the shim 12 is reduced and the bearing support 7 is moved toward the end surface 1b so as to increase the preload.

When the adjustment of the preload applied to the thrust bearings 9 and 10 performed by adjusting the thickness of the shim 12 is finished, the process of attaching the rotary table 2 to the frame 1 is completed. Next, a cover 13 is attached to the rotary table 2 with bolts 14. The cover 13 is used for covering the through hole 2c, which is required for attaching the rotary table 2 to the frame 1, after the rotary table 2 is attached to the frame 1, and prevents foreign bodies such as cutting chips and cutting fluid from entering the inside of the index table assembly 50.

As described above, in the process of attaching the rotary table 2 to the frame 1, the rotary table 2, the two thrust bearings 9 and 10, the radial bearing 11, and the bearing support 7 are all installed from the same side of the frame 1, that is, from the side of the workpiece-receiving surface 2a. Therefore, the rotary table 2 is easily attached, and the preload applied to the thrust bearings 9 and 10 is accurately adjusted. Accordingly, the rotary table 2 is installed with high precision.

Since the bearing support 7 is detachably attached to the shaft portion 1a which extends through the step portion 2d, the end surface 1b projects from the step surface 2e of the step portion 2d. Accordingly, the relative position between the bearing support 7 and the shaft portion 1a is adjusted in a region outside the step portion 2d, and the preload applied to the thrust bearings 9 and 10 is easily and accurately adjusted using the shim 12.

Second Embodiment

Figure 3:
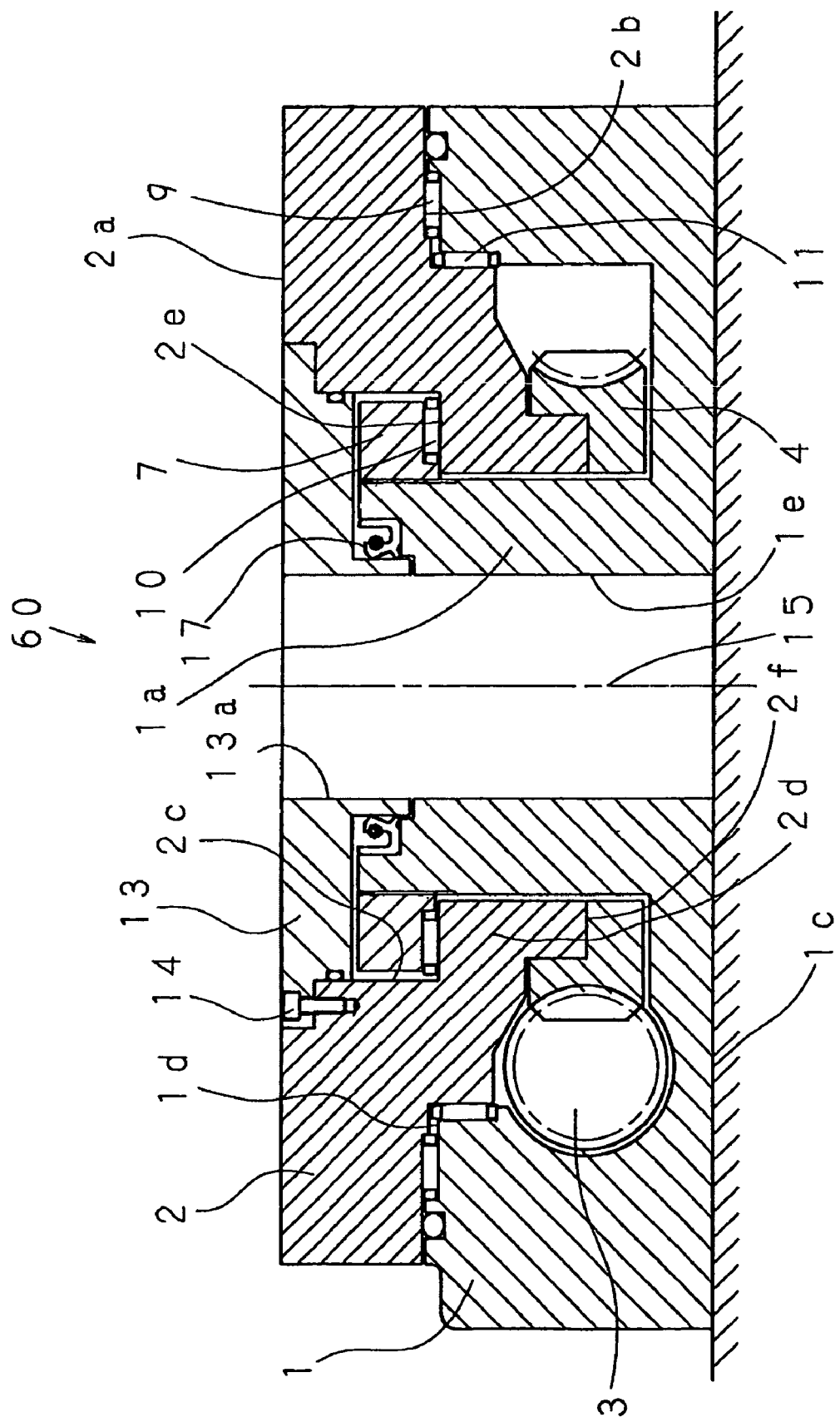
FIG. 3 is a sectional view of an index table assembly according to a second embodiment of the present invention.

FIG. 3 shows an index table assembly 60 according to a second embodiment of the present invention.

The index table assembly 60 includes a radial bearing 11 having a larger diameter than the one used in the first embodiment, so that the radial bearing 11 can receive a large load in the radial direction. A frame 1 and a cover 13 are provided with a through hole 1e and a through hole 13a, respectively, for receiving a jig at a rotational center of a rotary table 2. In addition, an oil seal 17 is provided between the frame 1 and the cover 13 for preventing foreign bodies such as cutting chips and cutting fluid from entering the inside of the index table assembly 60 through the through holes 1e and 13a.

Similar to the index table assembly 50 according to the first embodiment, a bearing support 7 is detachably attached to a shaft portion 1a at an end thereof, so that a preload applied to thrust bearings 9 and 10 is easily adjusted. More specifically, a male thread is formed in the shaft portion 1a of the frame 1 at the end thereof, and is engaged with a female thread formed in the inner periphery of the bearing support 7, which is ring-shaped. The tightening force applied to the thrust bearing 10 by the bearing support 7, that is, the pressing force applied to the thrust bearing 10 is adjusted by adjusting the engagement between the male and female threads, and thus the preload applied to the thrust bearings 9 and 10 is adjusted as in the first embodiment.

Similar to the first embodiment, in the process of attaching the rotary table 2 to the frame 1, the rotary table 2, the two thrust bearings 9 and 10, the radial bearing 11, and the bearing support 7 are all installed from the same side of the frame 1, that is, from the side of a workpiece-receiving surface 2a. The radial bearing 11 is installed onto the frame 1 before the rotary table 2 is installed.

Third Embodiment

Figure 4:
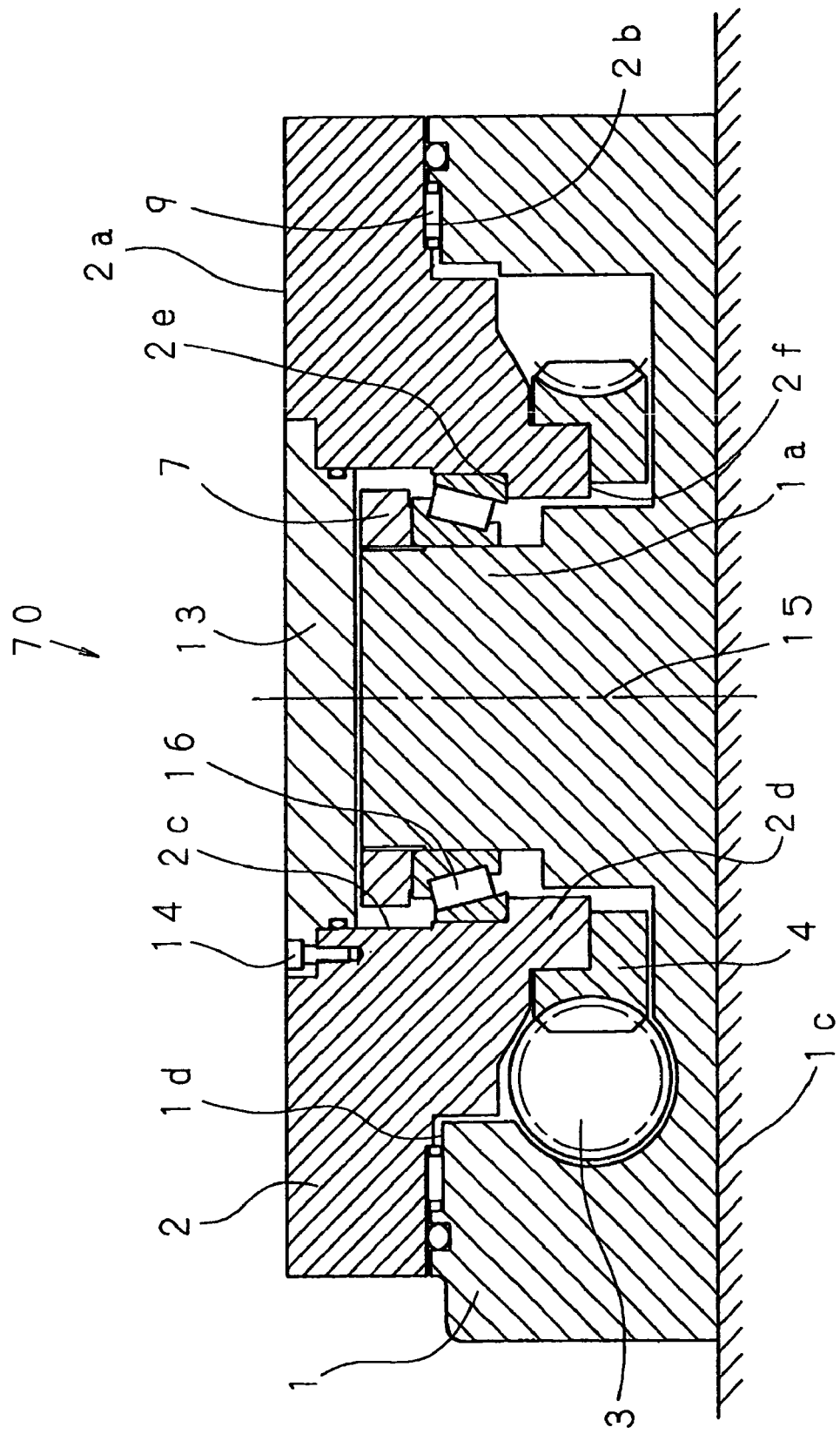
FIG. 4 is a sectional view of an index table assembly according to a third embodiment of the present invention.

FIG. 4 shows an index table assembly 70 according to a third embodiment of the present invention.

In the present embodiment, a tapered roller bearing 16 is provided in place of the thrust bearing 10 and the radial bearing 11 included in the index table assembly 50 according to the first embodiment.

A step surface 2e on the same side as a workpiece-receiving surface 2a of a rotary table 2 faces a bearing support 7 such that the step surface 2e and the bearing support 7 are shifted relative to each other in the radial direction of the rotary table 2. Accordingly, an outer race of the tapered roller bearing 16 is in contact with the step surface 2e and an inner surface of through hole 2c, and an inner race of the tapered roller bearing 16 is in contact with the bearing support 7 and an outer surface of a shaft portion 1a of a frame 1. Thus, the tapered roller bearing 16 receives not only a force in a direction opposite to the direction from the workpiece-receiving surface 2a to the frame 1 along a rotational axis 15 but also a radial force, that is, a force in a direction perpendicular to the rotational axis 15.

Similar to the index table assembly 60 according to the second embodiment, the bearing support 7 is detachably attached to the shaft portion 1a at an end thereof. More specifically, a male thread is formed in the shaft portion 1a at the end thereof and is engaged with a female thread formed in the inner periphery of the bearing support 7, which is ring-shaped. In addition, similar to the second embodiment, the preload applied to a thrust bearing 9 and the tapered roller bearing 16 is adjusted by adjusting the engagement between the male and female threads.

Similar to the first and second embodiments, in the process of attaching the rotary table 2 to the frame 1, the rotary table 2, the thrust bearing 9, the tapered roller bearing 16, and the bearing support 7 are all installed from the same side of the frame 1, that is, from the side of the workpiece-receiving surface 2a.

Fourth Embodiment

Figure 5:
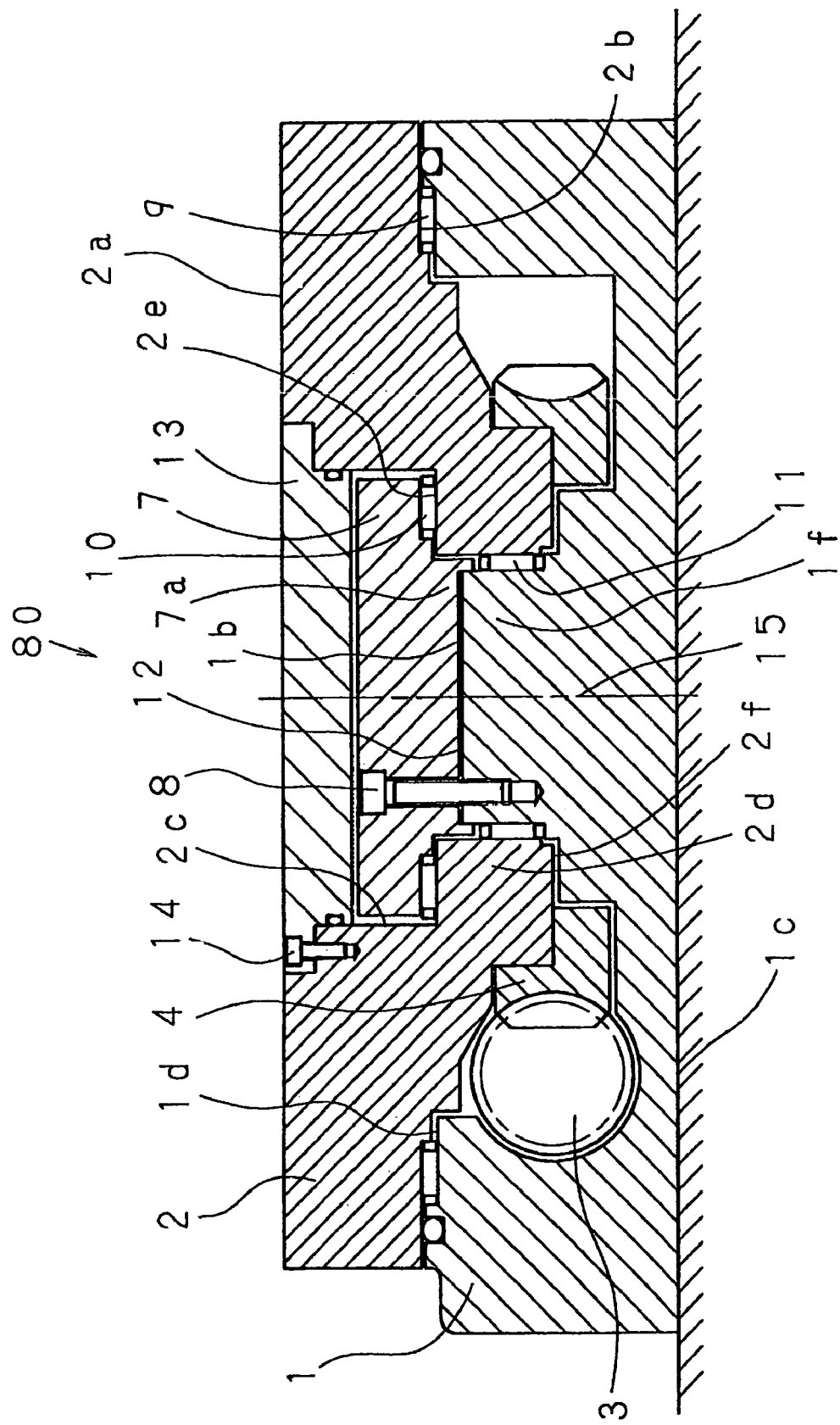
FIG. 5 is a sectional view of an index table assembly according to a fourth embodiment of the present invention.

FIG. 5 shows an index table assembly 80 according to a fourth embodiment of the present invention.

The index table assembly 80 is different from the index table assembly 50 according to the first embodiment in that the main body and a bearing support 7 of a frame 1 are provided with a shaft portion 1*f* and a shaft portion 7*a*, respectively, and the shaft portions 1*f* and 7*a* function as the shaft portion 1*a* of the frame 1 which extends through a step portion 2*d*. More specifically, the index table assembly 80 is different from the index table assembly 50 according to the first embodiment in that the bearing support 7 is not attached to an end portion of the shaft portion 1*a* of the frame 1. Accordingly, when the rotary table 2 is attached to the frame 1, the adjustment of the preload is performed using a shim 12 which is placed on an end surface 1*b* in a space surrounded by the step portion 2*d* in a through hole 2*c*.

Processes of attaching the rotary table 2 to the frame 1 and adjusting the preload applied to thrust bearings 9 and 10 by adjusting the thickness of the shim 12 are similar to those of the first embodiment.

In the fourth embodiment, the main body and the bearing support 7 of the frame 1 are provided with the shaft portions 1*f* and 7*a*, respectively, and the shaft portions 1*f* and 7*a* function as the shaft portion 1*a* which extends through the step portion 2*d*. However, only the bearing support 7 may have a shaft portion 7*a* which functions as the shaft portion 1*a*. In such a case, the shaft portion 7*a* of the bearing support 7, that is, the shaft portion 1*a*, is inserted through the step portion 2*d* and is fitted to the main body of the frame 1.

The present invention is not limited to the above-described embodiments, and various modifications are possible within the scope of the present invention.

What is claimed is:

1. An index table assembly comprising:
    a rotary table having a workpiece-receiving surface on one side and a through hole at a rotational center of the rotary table, the through hole having a step portion extending toward the rotational center in the middle of the through hole;
    a frame which supports the rotary table such that the rotary table can revolve and which is separated from the rotary table in the direction of a rotational axis of the rotary table and including a shaft portion extending through the step portion and a bearing support detachably attached to the shaft portion, the bearing support facing a step surface of the step portion on the same side as the workpiece-receiving surface of the rotary table; and
    first and second bearings disposed between the rotary table and the frame, the first bearing being positioned between a surface of the rotary table on the side opposite to the workpiece-receiving surface and the frame and the second bearing being positioned between the step surface of the step portion on the same side as the workpiece-receiving surface and the bearing support.

2. An index table assembly according to claim 1, wherein the first bearing has a larger diameter than the second bearing.

3. An index table assembly according to claim 2, wherein the bearing support is detachably attached to the shaft portion at an end of the shaft portion.

4. An index table assembly according to claim 2, wherein a portion of the rotary table including the workpiece-receiving surface and the step portion consist of a single material.

5. An index table assembly according to claim 2, wherein the surfaces between which the first and second bearings are disposed are perpendicular to the rotational axis of the rotary table.

6. An index table assembly according to claim 2, wherein both of the first and second bearings are thrust bearings.

7. An index table assembly according to claim 1 wherein the bearing support is detachably attached to the shaft portion at an end of the shaft portion.

8. An index table assembly according to claim 1, wherein a portion of the rotary table including the workpiece-receiving surface and the step portion consist of a single material.

9. An index table assembly according to claim 1, wherein the surfaces between which the first and second bearings are disposed are perpendicular to the rotational axis of the rotary table.

10. An index table assembly according to claim 1, wherein both of the first and second bearings are thrust bearings.

* * * * *